(12) United States Patent
Capoglu et al.

(10) Patent No.: US 11,372,127 B2
(45) Date of Patent: Jun. 28, 2022

(54) SYSTEMS AND METHODS TO MONITOR DOWNHOLE RESERVOIRS

(71) Applicant: Halliburton Energy Services, Inc., Houston, TX (US)

(72) Inventors: Ilker R. Capoglu, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 440 days.

(21) Appl. No.: 16/336,831

(22) PCT Filed: Dec. 30, 2016

(86) PCT No.: PCT/US2016/069480
§ 371 (c)(1),
(2) Date: Mar. 26, 2019

(87) PCT Pub. No.: WO2018/125207
PCT Pub. Date: Jul. 5, 2018

(65) Prior Publication Data
US 2021/0278560 A1  Sep. 9, 2021

(51) Int. Cl.
*G01V 3/28* (2006.01)
*E21B 49/00* (2006.01)
(Continued)

(52) U.S. Cl.
CPC .............. *G01V 3/28* (2013.01); *E21B 49/00* (2013.01); *G01V 3/38* (2013.01); *E21B 43/20* (2013.01)

(58) Field of Classification Search
CPC ......... G01V 3/28; E21B 49/00; E21B 47/135; E21B 43/20
See application file for complete search history.

(56) References Cited

U.S. PATENT DOCUMENTS

| 7,812,610 B2 | 10/2010 | Clark et al. |
| 2005/0179437 A1* | 8/2005 | Hayman ................. G01V 3/24 324/347 |

(Continued)

FOREIGN PATENT DOCUMENTS

| WO | 2014089505 A1 | 6/2014 |
| WO | 2015178876 A1 | 11/2015 |

(Continued)

OTHER PUBLICATIONS

International Search Report & Written Opinion issued for corresponding International Application No. PCT/US2016/069480 dated Sep. 26, 2017. (15 pages).

*Primary Examiner* — Alesa Allgood
(74) *Attorney, Agent, or Firm* — McGuireWoods LLP

(57) ABSTRACT

The disclosed embodiments include downhole electromagnetic reservoir monitors, and systems and methods to monitor downhole reservoirs. In one embodiment, the electromagnetic reservoir monitor includes a galvanic transmitter deployed proximate a wellbore casing and having a source electrode and a return electrode, where a current flowing from the source electrode, through a formation, to the return electrode is altered by a fluid reservoir of the formation, and where an altered component of the current induces a secondary magnetic field. The electromagnetic reservoir monitor also includes a magnetic receiver having a tilted coil deployed proximate the wellbore casing, the tilted coil having an orientation relative to a cross sectional plane normal to a longitudinal axis of the wellbore casing, and the tilted coil operable to detect a component of the secondary magnetic field, where the secondary magnetic field is indicative of at least one property of the fluid reservoir.

20 Claims, 9 Drawing Sheets

(51) Int. Cl.
*G01V 3/38* (2006.01)
*E21B 43/20* (2006.01)

(56) References Cited

U.S. PATENT DOCUMENTS

| | | | |
|---|---|---|---|
| 2009/0091328 A1* | 4/2009 | Clark | G01V 3/28 |
| | | | 324/338 |
| 2010/0194394 A1 | 8/2010 | Zhdanov et al. | |
| 2012/0026314 A1* | 2/2012 | Zhdanov | G01V 3/26 |
| | | | 348/85 |
| 2014/0139225 A1 | 5/2014 | Mandviwala | |
| 2014/0239957 A1* | 8/2014 | Zhang | E21B 47/11 |
| | | | 324/334 |
| 2016/0282504 A1 | 9/2016 | Wilson et al. | |
| 2017/0090060 A1* | 3/2017 | Donderici | G01V 3/24 |

FOREIGN PATENT DOCUMENTS

| | | |
|---|---|---|
| WO | 2015178878 A1 | 11/2015 |
| WO | 2015-199648 A1 | 12/2015 |
| WO | 2017086957 A1 | 5/2017 |
| WO | 2018156126 A1 | 8/2018 |

\* cited by examiner

SYSTEMS AND METHODS TO MONITOR DOWNHOLE RESERVOIRS

BACKGROUND

The present disclosure relates generally to downhole electromagnetic reservoir monitors, downhole electromagnetic reservoir monitoring systems, and methods to monitor downhole reservoirs.

Fiber-optic based electromagnetic reservoir monitoring systems are sometimes deployed in a wellbore of a downhole hydrocarbon production environment to measure and monitor downhole reservoirs. The electromagnetic reservoir monitor sometimes include one or more electromagnetic sensors operable to transmit electromagnetic signals that traverse surrounding formations, and to detect variations to transmitted electromagnetic signals as well as secondary electromagnetic signals induced by the surrounding formations, which are indicative of one or more properties of nearby reservoirs ("reservoir properties"). Examples of reservoir properties include but are not limited to reservoir dimensions, absolute reservoir location, relative reservoir location with respect to a component of the electromagnetic reservoir monitor, fluid type, fluid composition, fluid conductivity, fluid resistivity, electrical, magnetic, chemical, temperature, pressure, pH, humidity, vibration, displacement, velocity, torque, acceleration, as well as quantifiable properties of the fluid and/or the fluid reservoir. The electromagnetic sensors are coupled to a fiber optic sensor, which is operable to generate optical signals and/or modulate optical signals based on the detected electromagnetic signals. The generated and/or modulated optical signals are transmitted via an optical fiber coupled to the optical sensor towards the surface, where the optical signals are processed to determine the reservoir properties.

Most electromagnetic sensors utilize magnetic transmitters and receivers, which are formed from one or more coils or galvanic transmitters and receivers, which are formed from one or more electrodes. Many magnetic transmitters and receivers efficiently operate at frequencies between 50-100 kHz, whereas optic based components, such as fiber optic sensors and demodulators operate at frequencies under 50 kHz. Further, it is sometimes difficult to excite magnetic transmitters that are deployed hundreds to thousands of feet downhole. Galvanic sensors may efficiently operate at frequencies that are more compatible with the operational frequencies of optic based components. However, it is often more difficult to impedance match optical based components to galvanic sensors to optic based components relative to magnetic sensors. Further, galvanic receivers have lower sensitivity to electromagnetic signals relative to magnetic receivers.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

Figure 1A:
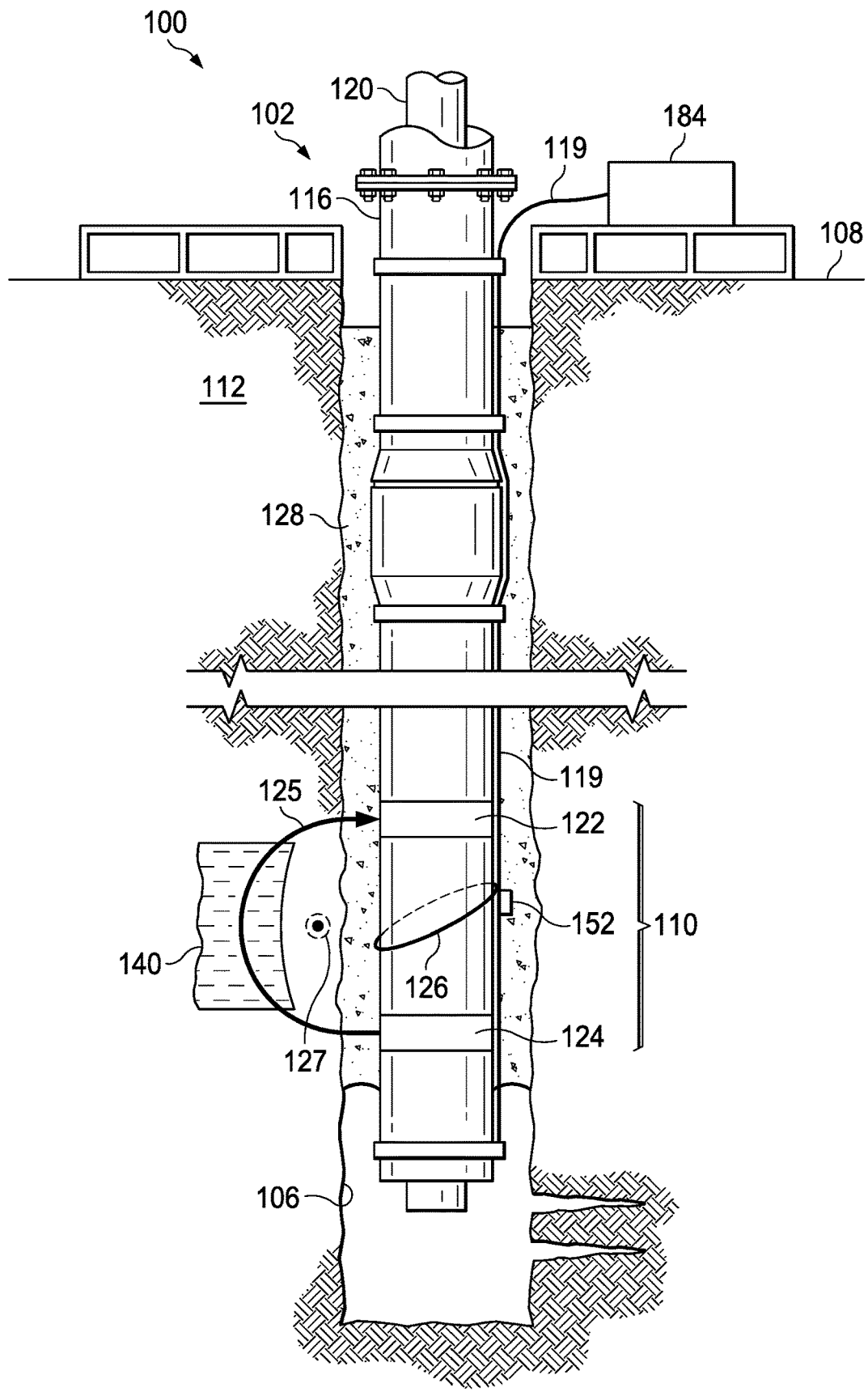
FIG. 1A illustrates a schematic view of a production environment in which an electromagnetic reservoir monitor is coupled to an optical fiber and is deployed together with the optical fiber along an exterior surface of a casing.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to downhole electromagnetic reservoir monitors, downhole electromagnetic reservoir monitoring systems, and methods to monitor downhole reservoirs. The electromagnetic reservoir monitor is coupled to an optical fiber that is deployed downhole. The electromagnetic reservoir monitor includes a galvanic transmitter formed from one or more sets of source and return electrodes and a magnetic receiver formed from at least one tilted coil.

This combination of galvanic transmitter and magnetic receiver ("hybrid combination") benefits from the advantages of galvanic/galvanic transmitter/receiver and magnetic/magnetic transmitter/receiver combinations as discussed in the paragraphs above. For example, the hybrid combination utilizes a galvanic transmitter, which is operable to operate at a frequency range between 1-50 kHZ. The foregoing range of operational frequency is compatible with the operational frequency range of most optical components utilized for fiber optic downhole sensing. Further, relative to an amount of energy required to excite a magnetic transmitter of a magnetic/magnetic combination, less amount of energy is required to excite the galvanic transmitter of the hybrid combination. Further, the hybrid combination utilizes a magnetic receiver, which is more sensitive to electromagnetic signals relative to a galvanic receiver. Thus, the hybrid combination is operable to detect electromagnetic signals that may not be picked up by a galvanic receiver of a galvanic/galvanic transmitter/receiver combination. Further, the magnetic receiver reduces impedance matching issues galvanic receivers may experience.

The galvanic transmitter component of the hybrid combination includes a source electrode and a return electrode. Current flowing from the source electrode is injected into the surrounding formation, which includes a fluid reservoir, such as a water flood region, a hydrocarbon reservoir, or another subterranean fluid reservoir. The transmitted current interacts with fluids in the fluid reservoir and is altered by the fluids in the fluid reservoir. The altered current induces a secondary magnetic field, which is detected by the magnetic receiver component of the hybrid combination.

In one embodiment, the galvanic transmitter includes one set of source and return electrodes that are positioned along different sections of a casing that is deployed downhole.

In another embodiment, the galvanic transmitter includes multiple sets of source and return electrodes that are positioned at different azimuths around a perimeter of the wellbore casing, where each source electrode of the multiple sets of source electrodes is operable to inject current into the surrounding formation. However, since different source electrodes are positioned at different azimuths relative to each other, currents are injected in different directions, and induce magnetic fields having different directions. The magnetic fields may be detected by the magnetic receiver to achieve azimuthal sensitivity of the fluids.

In some embodiments the magnetic receiver of the hybrid combination is formed from one tilted coil that is wrapped around or positioned along the casing. As defined herein, a coil is tilted if the coil is not positioned horizontally relative to a longitudinal axis of the casing. In other embodiments, the magnetic receiver is formed from multiple tilted coils that are tilted in different orientations relative to the longitudinal axis of the casing to increase sensitivity to the secondary magnetic fields induced by the fluids of the fluid reservoir, where magnetic signals of the detected magnetic fields are indicative of one or more reservoir properties discussed herein.

The electromagnetic reservoir monitor also includes optical components such as optical sensors, demodulators, as well as other optical components that generate optical signals and/or modulate optical signals indicative of the one or more reservoir properties. The generated and/or modulated optical signals are transmitted along the optical fiber to an electronic or optoelectronic device ("controller") that is operable to process the generated and/or modulated optical signals to determine the one or more reservoir properties.

Additional details of the foregoing electromagnetic reservoir monitor device, electromagnetic reservoir monitor system, and methods to monitor downhole reservoirs are provided in the paragraphs below and are illustrated in at least FIGS. 1-8.

Now turning to the figures, FIG. 1A illustrates a schematic view of a production environment 100 in which an electromagnetic reservoir monitor 110 is coupled to an optical fiber 119 and is deployed together with the optical fiber 119 along an exterior surface of a casing 116. In the embodiment of FIG. 1A, well 102 includes a wellbore 106, which extends from a surface 108 of the well 102 to or through a subterranean formation 112. The casing 116 extends from a surface 108 of well 102 down wellbore 106 to insulate downhole tools and strings deployed in the casing 116 as well as hydrocarbon resources flowing through casing 116 from the surrounding subterranean formation 112, to prevent cave-ins, and/or to prevent contamination of the surrounding subterranean formation 112. The casing 116 is normally surrounded by a cement sheath 128 formed from cement slush, and deposited in an annulus between the casing 116 and the wellbore 106 to fixedly secure the casing 116 to the wellbore 106 and to form a barrier that isolates the casing 116. Although not depicted, there may be layers of casing concentrically placed in the wellbore 106, each having a layer of cement or the like deposited thereabout.

The electromagnetic reservoir monitor 110 is coupled to the optical fiber 119, which extends along the casing 116 down the wellbore 106. In such embodiments, the optical fiber 119 and the electromagnetic reservoir monitor 110 are permanently deployed downhole during the operational life expectancy of the well 102 to monitor downhole reservoirs, such as fluid reservoir 140. As defined herein, a fluid reservoir may be a reservoir of one of more fluids deposited in the subterranean formation 112, such as but not limited to hydrocarbon deposits, water flood, as well as other types of fluids deposited in the subterranean formation 112.

A conveyance 120 is deployed in an annulus of the casing 116. In some embodiments, the conveyance 120 may be wireline, slickline, coiled tubing, drill pipe, production tubing, downhole tractor or another type of conveyance operable to deploy an electromagnetic reservoir monitor and a non-permanently deployed optical fiber during the operation of the well 102. In such embodiments, the electromagnetic reservoir monitor and the non-permanently deployed optical fiber are temporarily deployed proximate the fluid reservoir 140 to monitor the fluid reservoir 140. As defined herein, a tool, device, or component is permanently deployed if the tool, device, or component is deployed for substantially the operational duration of the well 102, whereas the tool, device or component is temporarily deployed if the tool, device, or component is deployed for less than substantially the operational duration of the well 102. In the embodiment of FIG. 1A, the optical fiber 119 is directly connected to controller 184, which includes any electronic and/or optoelectronic device or detector operable to receive and/or process optical signals transmitted by the electromagnetic reservoir monitor 110. In further embodiments, optical signals transmitted along the optical fiber 119 are relayed by another device or telemetry system to the controller 184. In some embodiments, the controller 184 includes a storage medium containing instructions on how to process optical signals to determine reservoir properties and a processor operable to execute the instructions to determine the reservoir properties. In some embodiments, the controller 184 and the electromagnetic reservoir monitor 110 are components of a reservoir monitoring system deployed at the well 102.

The electromagnetic reservoir monitor 110 includes a galvanic transmitter having a source electrode 122 and a return electrode 124, where the source and the return electrodes 122 and 124 are deposited at different depths. The source electrode 122 is operable to inject current flowing from the source electrode 122 into the subterranean formation 112 in a direction illustrated by arrow 125. As the injected current traverse through the subterranean formation 112 and the fluid reservoir 140, the injected current interacts with fluids of the fluid reservoir 140 and is altered by the subterranean formation 112 and by fluids of the fluid reservoir 140. Current altered by fluids of the fluid reservoir 140 also induces a secondary magnetic field 127, which may be interpreted to determine one or more reservoir discussed herein of the fluid reservoir 140. For example, fluid flow of fluids of the fluid reservoir 140 attracts the injected current and induces a secondary magnetic field based on the current.

The electromagnetic reservoir monitor 110 also includes a magnetic receiver formed from a tilted coil 126. Magnetic signals of the secondary magnetic field are detected by the tilted coil 126 and are provided to a fiber optic sensor component 152 of the electromagnetic reservoir monitor 110. The fiber optic sensor component 152, which may be any optoelectronic device operable to generate optical signals and/or modulate optical signals traversing the optical fiber 119 based on the detected magnetic signals of the secondary magnetic field. The generated and/or modulated optical signals are then transmitted along the optical fiber 119 to the controller 184 or to a similar device for processing.

Although FIG. 1A illustrates a galvanic transmitter having one set of source and return electrodes, the galvanic transmitter may be formed from multiple sets of source and return electrodes to increase azimuth sensitivity of the induced magnetic signals indicative of one or more reservoir properties of the fluid reservoir 140. As defined herein, azimuth sensitivity means sensitivity to electromagnetic signals along more than one orientation or direction. Similarly, although FIG. 1A illustrates a magnetic receiver having one tilted coil, the magnetic receiver may be formed from multiple tilted coils to increase azimuth sensitivity of the induced magnetic signals indicative of the one or more reservoir properties of the fluid reservoir 140. Additional details of the foregoing electromagnetic reservoir monitor 110 are provided in the paragraphs below and are illustrated in at least FIGS. 2-8. Although FIG. 1A illustrates an electromagnetic reservoir monitor 110, additional electromagnetic reservoir monitors (not shown) may be deployed at different sections of the optical fiber 119, or along the conveyance 120 to monitor additional fluid reservoirs. Further, although FIG. 1A illustrates deploying optical fiber 119 in downhole environments of on shore wells, the optical fiber 119 may also be deployed in subsea environments such as in offshore wells, or along the seafloor.

Figure 1B:
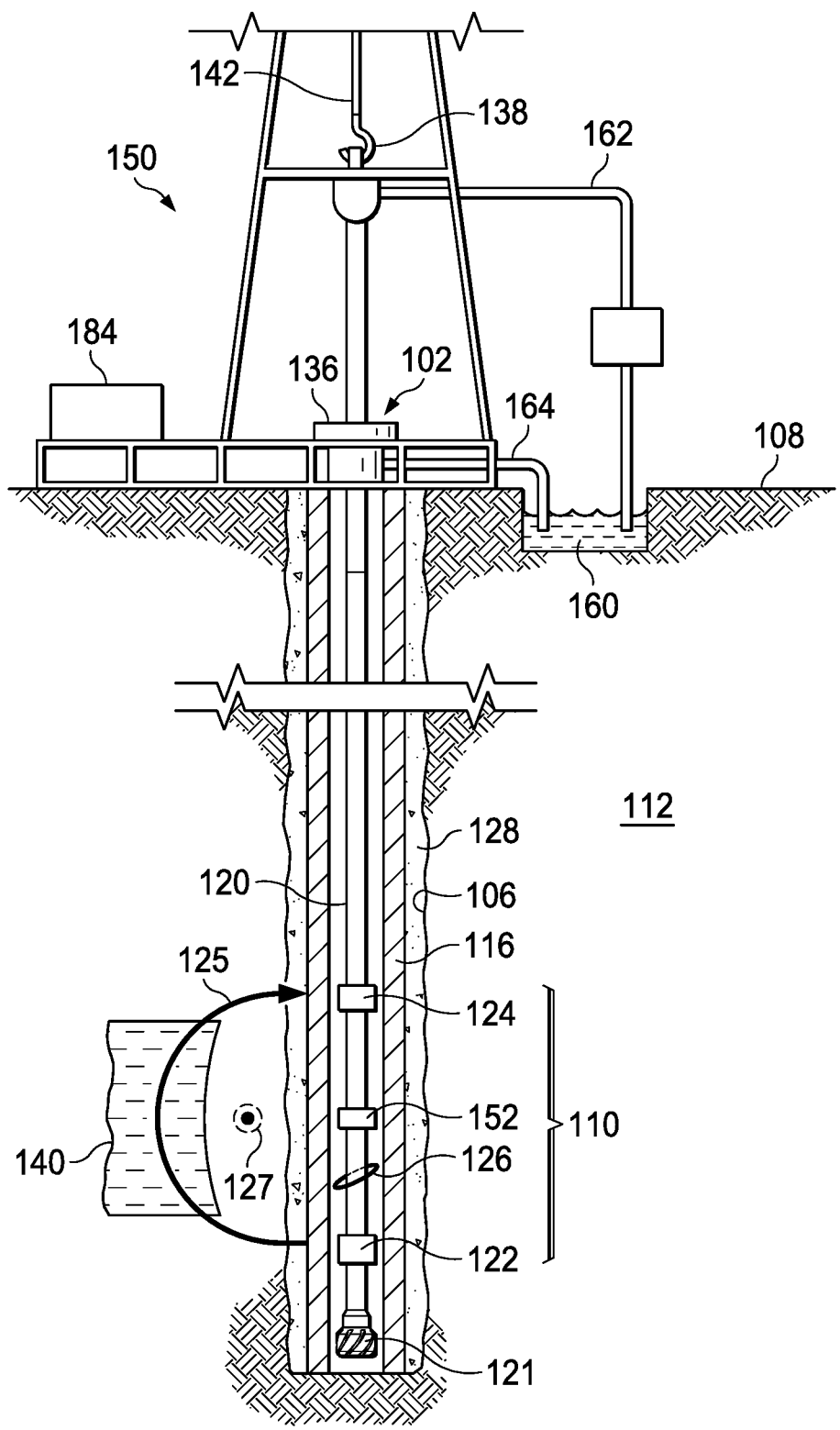
FIG. 1B illustrates a drilling environment in which the electromagnetic reservoir monitor of FIG. 1A is deployed in the wellbore.

In some embodiments, the electromagnetic reservoir monitor 110 is not permanently deployed along the casing 106. In such embodiments, the electromagnetic reservoir monitor 110 is deployed along a conveyance such as the conveyance 120 to a desired depth to monitor reservoir properties proximate the desired depth. FIG. 1B illustrates a drilling environment 150 in which electromagnetic reservoir monitor 110 of FIG. 1A is deployed in the wellbore 106.

A hook 138, cable 142, traveling block (not shown), hoist (not shown), and the conveyance 120 are provided to lower the electromagnetic reservoir monitor 110 down the wellbore 106 or to lift the electromagnetic reservoir monitor 110 up from the wellbore 106 during drilling operations. At wellhead 136, an inlet conduit 162 is coupled to a fluid source (not shown) to provide fluids, such as cement slush, drilling fluids, or other fluids, downhole. In some embodiments, an optical fiber such as the optical fiber 119 is deployed along the conveyance 120 and forms a telemetry system described herein. The conveyance 120 has an internal cavity that provides a fluid flow path for the fluid to flow from the surface 108 downhole. The fluid travels down the conveyance 120, and exits the conveyance 120 from drill bit 121. The fluid then travels along an annulus between the conveyance 120 and the casing 116 towards the surface 108, and exits the second wellbore annulus via an outlet conduit 164 where the fluid is captured in a container 160.

The electromagnetic reservoir monitor 110 may be deployed at different depths during drilling operations to monitor various reservoir properties at the different depths. In the embodiment of FIG. 1B, the electromagnetic reservoir monitor 110 is coupled to a section of the conveyance 120 that is proximate to the drill bit 121 and is operable to monitor reservoir properties proximate the drill bit 121. In other embodiments, the electromagnetic reservoir monitor 110 is coupled to other sections of the conveyance 120. Although FIG. 1B illustrates deploying the electromagnetic reservoir monitor 110 during drilling operations, the electromagnetic reservoir monitor 110 may also be temporarily deployed at different depths during non-drilling operations. In some embodiments, the electromagnetic reservoir monitor 110 is deployed along the conveyance 120 without the drill bit 121 to different depths to monitor reservoir properties proximate the different depths.

Figure 2:
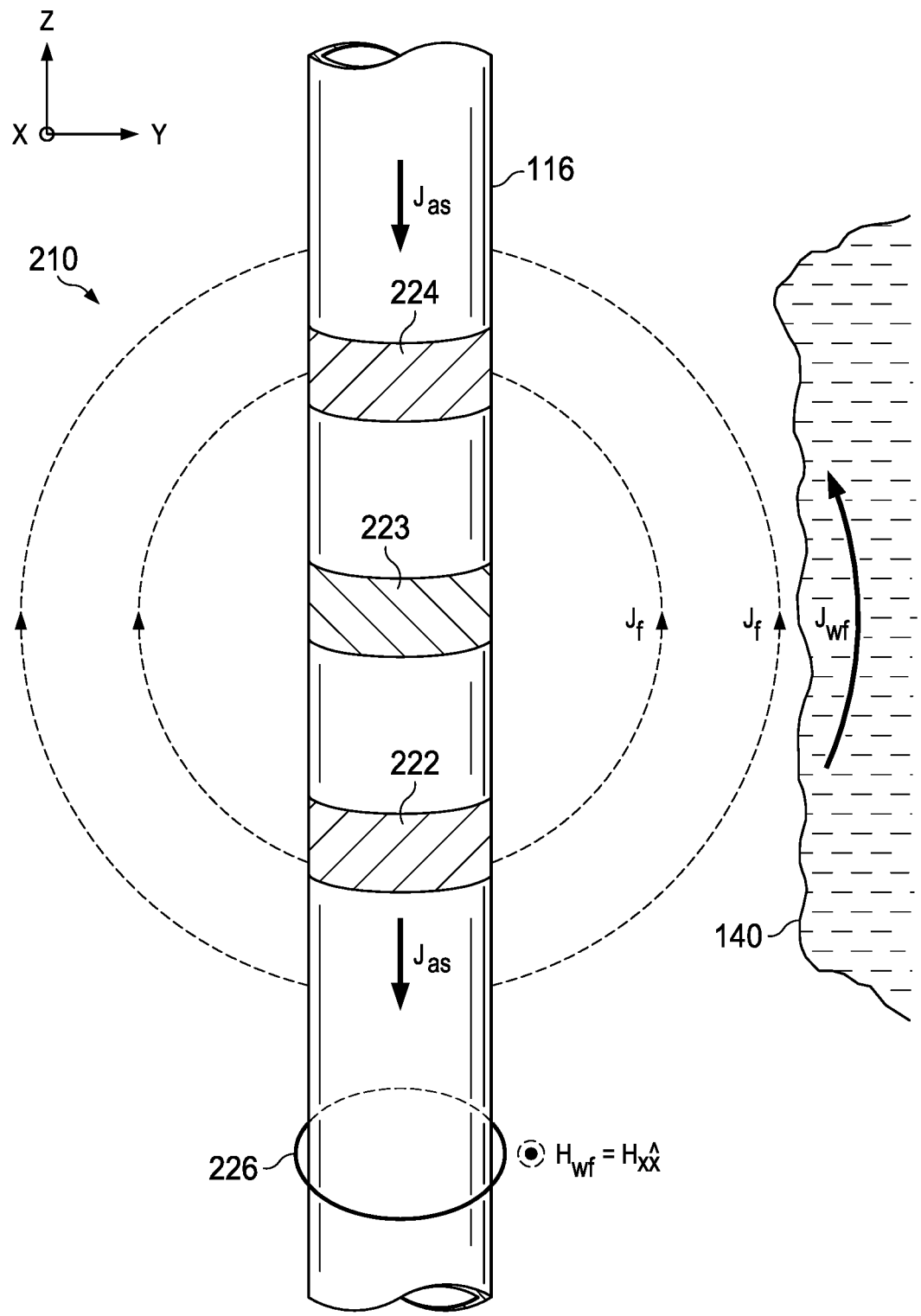
FIG. 2 illustrates a schematic view of an electromagnetic reservoir monitor having a galvanic transmitter formed from one set of source and return electrodes and a magnetic receiver formed from a tilted coil.

FIG. 2 illustrates a schematic view of an electromagnetic reservoir monitor 210 having a galvanic transmitter formed from one set of source and return electrodes 222 and 224, and a magnetic receiver formed from a tilted coil 226. The source electrode 222 resides in a source region and the return electrode 224 resides in a return region, where the source region and the return region are separated by a gap region 223 that separates the source region and the return region to prevent an electrical short. As shown in FIG. 2, currents flow from the source electrode 222 through the subterranean formation 112 and the fluid reservoir 140, and return to the return electrode 224. Currents that traverse the formation and the fluid reservoir $J_f$ and $J_{wf}$ respectively, are altered based on the properties of the subterranean formation 112 and the fluids of the fluid reservoir 140, respectively. The current altered by the fluid reservoir $J_{wf}$ is oriented in a direction along a z axis. As defined herein, the z axis is aligned with a longitudinal axis of the casing 116. Further, a x axis and a y axis are perpendicular axes that together form a plane that is normal to the z axis.

The current altered by the fluid reservoir $J_{wf}$ in turn induces a secondary magnetic field $H_{wf}$ in a direction along a positive direction of the x axis. The secondary magnetic field $H_{wf}$ is detected by the tilted coil 226. The fiber optic sensor component 252 then generates and/or modulates optical signals traversing the optical fiber 119 based on the detected magnetic signals of the secondary magnetic field $H_{wf}$ and transmits the generated and/or modulated optical signals along the optical fiber 119 to the controller 184 for processing.

Figure 3:
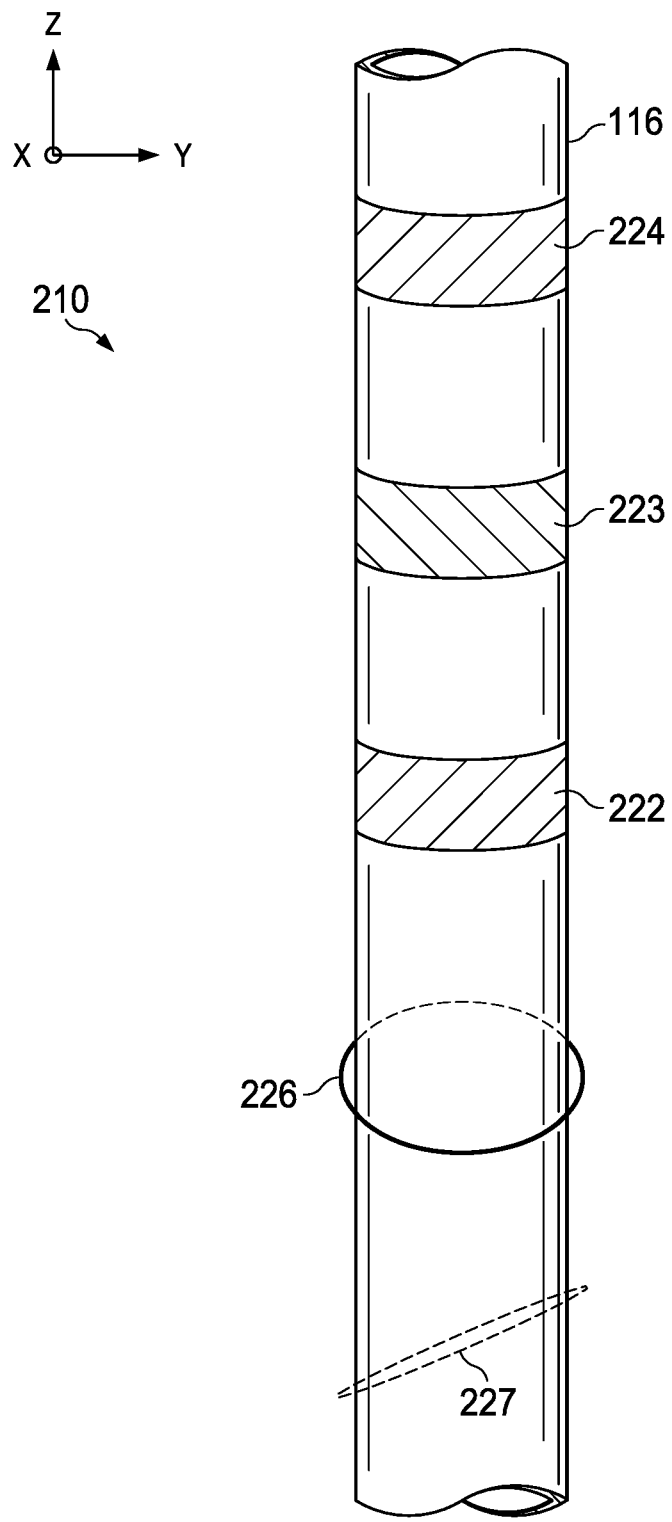
FIG. 3 illustrates a schematic view of an electromagnetic reservoir monitor similar to the electromagnetic reservoir monitor of FIG. 2 and having a galvanic transmitter formed from one set of source and return electrodes and a magnetic receiver formed from multiple tilted coils tilted at different orientations relative to each other.

FIG. 3 illustrates a schematic view of an electromagnetic reservoir monitor 260 similar to the electromagnetic reservoir monitor 210 of FIG. 2 and having a galvanic transmitter formed from one set of source and return electrodes 222 and 224 and a magnetic receiver formed from multiple tilted coils 226 and 227 tilted at different orientations relative to each other. In the embodiment of FIG. 3, the first tilted coil 226 is tilted in an orientation relative to the x-y plane such that the first tilted coil 226 is sensitive to fluids flowing in a direction along the y axis, which induce secondary magnetic fields traveling along the x axis. The second tilted coil 227 is tilted in another orientation relative to the y-z plane such that the second tilted coil 227 is sensitive to fluids flowing in a direction along the x axis, which would induce secondary magnetic fields traveling in a direction along the y axis. As such, the foregoing configuration provides the magnetic receiver of the electromagnetic reservoir monitor 260 with azimuthal sensitivity to secondary magnetic fields along multiple orientations. Although the magnetic receiver components of the electromagnetic reservoir monitor 260 includes two tilted coils 226 and 227, additional tilted coils (not shown) may be deployed along the casing 116 to increase sensitivity to magnetic signals traveling along additional directions and/or orientations relative to the longitudinal axis of the casing 116.

Figure 4:
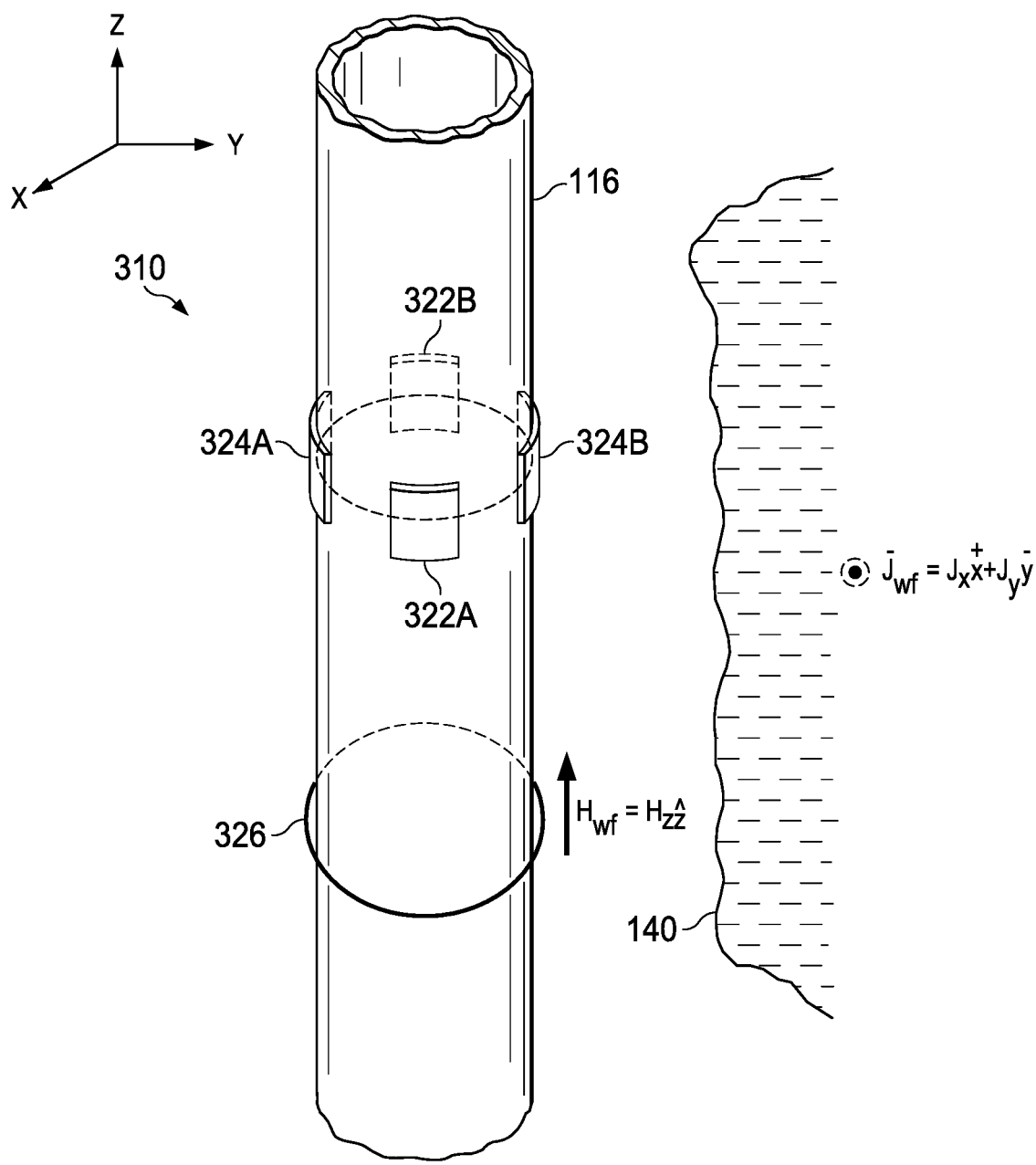
FIG. 4 illustrates a schematic view of another electromagnetic reservoir monitor having a galvanic transmitter formed from multiple sets of source and return electrodes and a magnetic receiver formed from a tilted coil.

FIG. 4 illustrates a schematic view of another electromagnetic reservoir monitor 310 having a galvanic transmitter formed from multiple sets of source and return electrodes positioned at different azimuths along a perimeter of the casing 116, and a magnetic receiver formed from a tilted coil 326. More particularly, the electromagnetic reservoir monitor 310 includes a first set of source and return electrodes 322A and 324A oriented in directions along the x axis and a second set of source and return electrodes 324A and 324B oriented in directions along the y axis. The orientation of the first set of electrodes 322A and 324A provides the magnetic receiver with greater sensitivity to fluid flow along the +y/−y directions. More particularly, when the first source electrode 322A is energized, current flows into the subterranean formation 112 and into the fluid reservoir in +y/−y directions. Fluid flow of fluids of the fluid reservoir 140 along the +y/−y directions attract the injected current and induce a secondary magnetic field $H_{wf}$ in a direction along the z axis. The tilted coil 326 of the magnetic receiver is oriented substantially perpendicular to the longitudinal axis of the casing 116 to provide increased sensitivity to secondary magnetic fields flowing in directions along the z axis. Similarly, the orientation of the second set of electrodes 322B and 324B provides the magnetic receiver with greater sensitivity to fluid flow along the +x/−x directions. More particularly, when the second source electrode 322B is energized, current flows into the subterranean formation 112 and into the fluid reservoir in +x/−x directions. The injected current is attracted to fluid flow of fluids of the fluid reservoir 140 along the +x/−x directions and induce a secondary magnetic field $H_{wf}$ in a direction along the z axis.

In some embodiments, all of the electrodes of the first and second sets of source and return electrodes 322A, 322B, 324A, and 324B are insulated from the casing 116 and from each other. In one of such embodiments, one or more galvanic insulation subs are deployed to insulate the electrodes 322A, 322B, 324A, and 324B. In some embodiments, one set of the two sets of source and return electrodes is active at a time. Although the galvanic transmitter of FIG. 4 includes two sets of source and return electrodes 322A, 322B, 324A, and 324B, the galvanic transmitter may be formed from additional sets of source and return electrodes to provide azimuth sensitivity.

Figure 5:
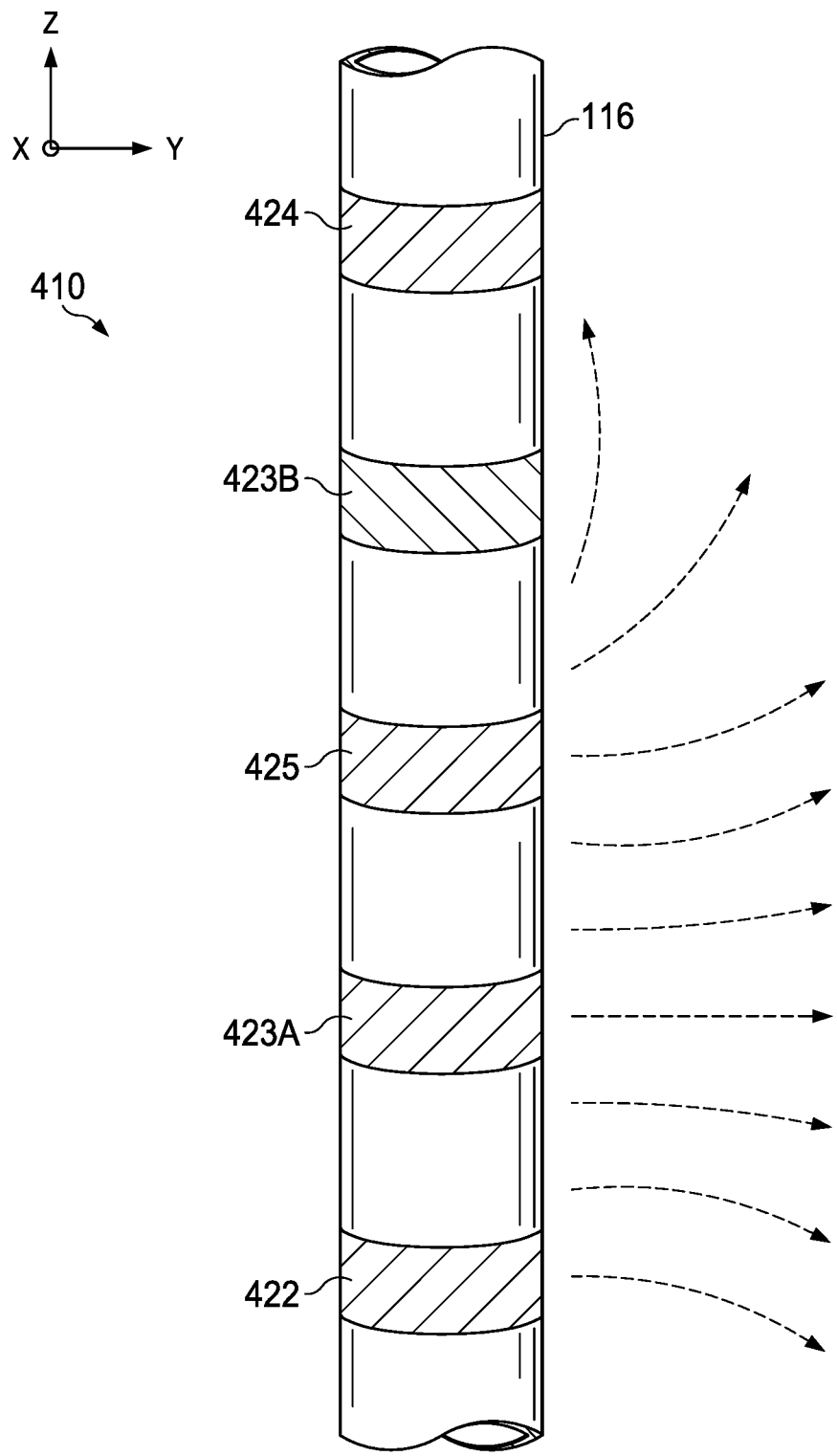
FIG. 5 illustrates a schematic view of an electromagnetic reservoir monitor having a galvanic transmitter formed from a source electrode, a return electrode, and a focusing electrode positioned in between the source electrode and the return electrode.

FIG. 5 illustrates a schematic view of an electromagnetic reservoir monitor 410 having a galvanic transmitter formed from a source electrode 422, a return electrode 424, and a focusing electrode 425 positioned in between the source electrode 422 and the return electrode 424. The focusing electrode 425 focuses currents injected by the source electrode 422 deeper into the subterranean formation 112. A first isolation gap 423A and a second isolation gap 423B are formed between the source electrode 422 and the focusing electrode 425, and between the focusing electrode 425 and the return electrode 424, respectively. Further, the first and second electrodes 422 and 424 are positioned within the source region and the return region, respectively. In some embodiments, the voltage of the focusing electrode is adjusted until the voltage of the focusing electrode 425 is substantially similar to the voltage of the source electrode 422 to minimize vertical current flow in the region between the focusing electrode and the source electrode.

Figure 6:
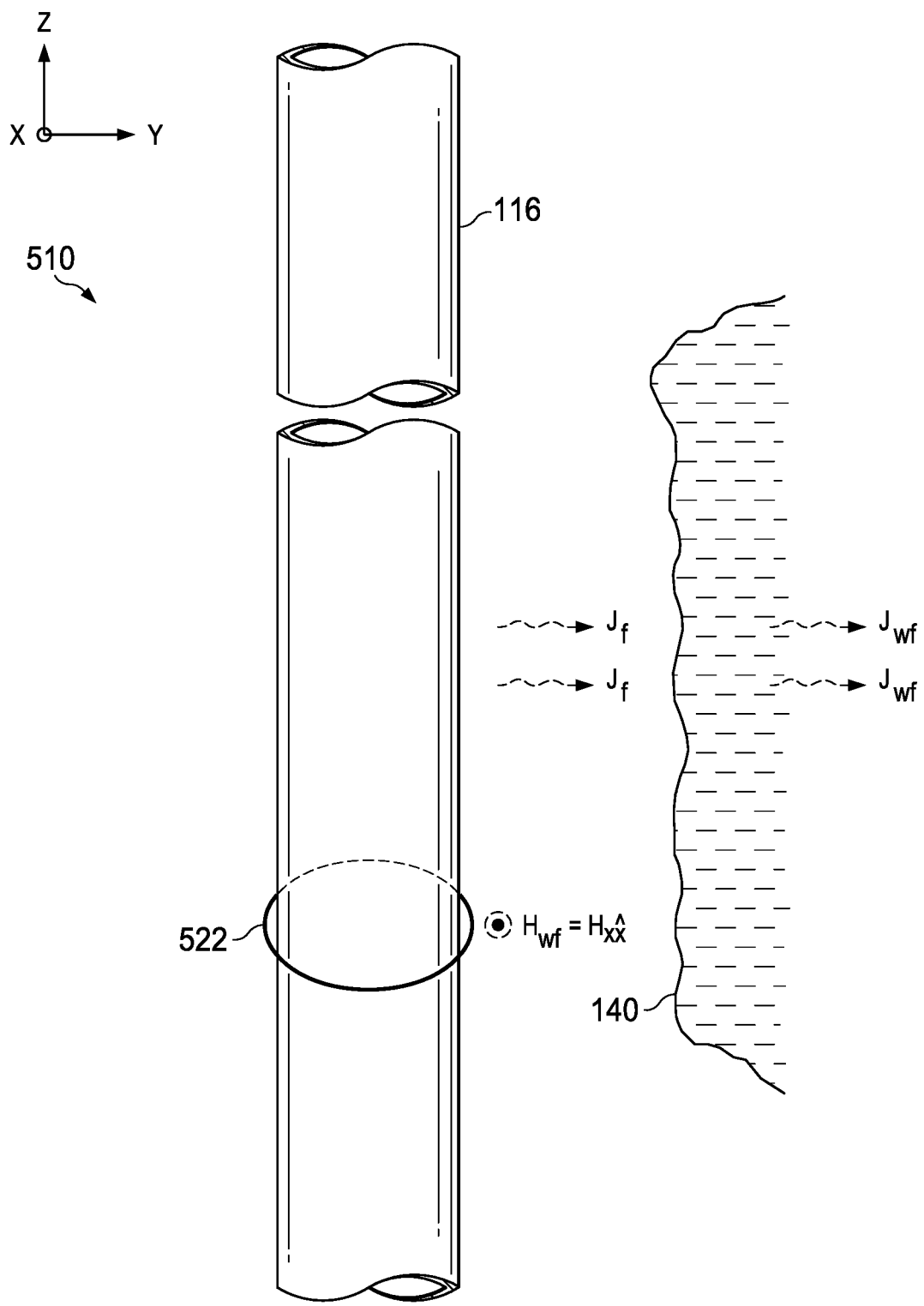
FIG. 6 illustrates a schematic view of an electromagnetic reservoir monitor where the casing is utilized as a current source.

FIG. 6 illustrates a schematic view of an electromagnetic reservoir monitor 510 where the casing 116 is utilized as a current source. In the embodiment of FIG. 6, a segment of the casing 116 is energized at the surface 108 via a voltage source. The metallic surface of the segment of the casing 116 becomes an extended electrode that injects current radially outwards into the subterranean formation 112. In some embodiments, the return electrode (not shown) is deployed somewhere in the subterranean formation 112. The electromagnetic reservoir monitor 510 also includes a magnetic receiver formed from a tilted coil 522. The tilted coil is oriented to detect secondary magnetic fields traveling along +x/−x directions. Additional tilted coils may be deployed to achieve azimuth sensitivity to secondary magnetic fields traveling along other directions.

Figure 7A:
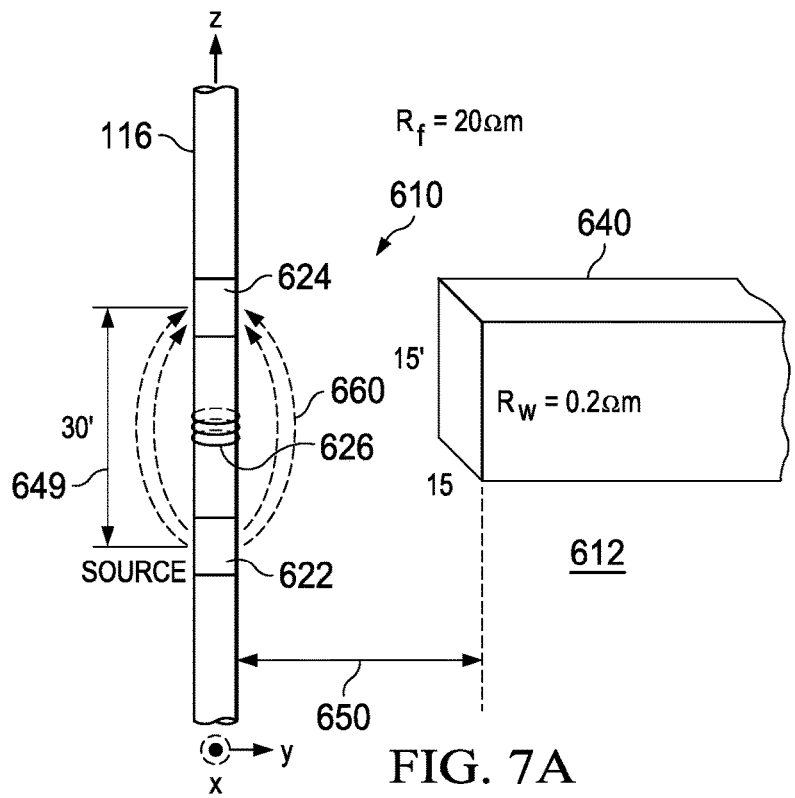
FIG. 7A illustrates a schematic view of an electromagnetic reservoir monitor similar to the electromagnetic reservoir monitor of FIG. 2, where the magnetic receiver is deployed in between the source and return electrodes of the magnetic receiver.

FIG. 7A illustrates a schematic view of an electromagnetic reservoir monitor 610 similar to the electromagnetic reservoir monitor of FIG. 2, where the magnetic receiver 626 is deployed in between the source and return electrodes 622 and 624 of the galvanic transmitter. In the embodiment of FIG. 7A, a fluid reservoir 640 having dimensions along a x-axis and a z-axis of approximately 15 feet by 15 feet is deposited in formation 612 at a distance represented by line 650. Further, the distance between the source and return electrodes 622 and 624 is represented by arrowed line 649 and is approximately 30 feet. Further, coils of the magnetic receiver 626 are tilted at approximately 45° and have a magnetic moment approximately along the xz plane. As shown in FIG. 7A, a current with approximately a one Amp peak amplitude flows from the source electrode 622, through the formation, which includes fluid reservoir 640, to the return electrode 624. The current is represented by arrowed lines 660. Further, the resistivity of the formation 612 around the casing 116 is approximately 20 Ω.m, whereas the resistivity of the fluid reservoir 640 is approximately 0.2 Ω.m.

Figure 7B:
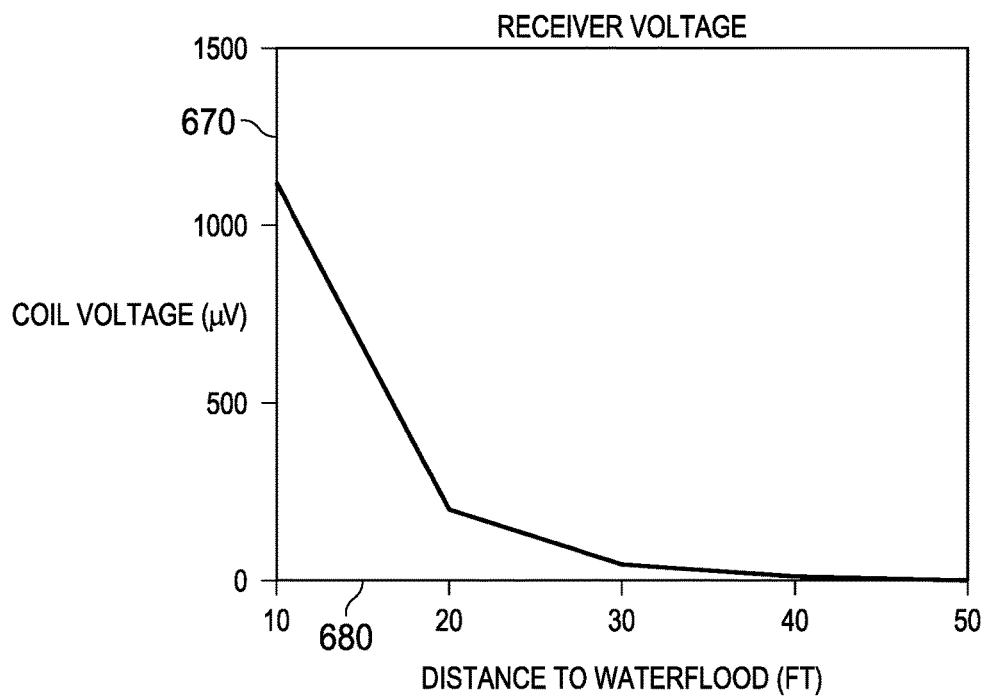
FIG. 7B is a plot illustrating receiver voltage at the magnetic receiver of the electromagnetic reservoir monitor of FIG. 7A as a function of distance of the magnetic receiver from the fluid reservoir of FIG. 7A.

FIG. 7B is a plot illustrating receiver voltage at the magnetic receiver 626 of FIG. 7A as a function of distance of the magnetic receiver 626 to the fluid reservoir 640. Axis 670 represents coiled voltage detected by the magnetic receiver 626 in units of micron-volts whereas axis 680 represents distance from the magnetic receiver 626 to the fluid reservoir 640 in units of feet. The signal level detected by the magnetic receiver 626 is approximately equal to the signal level detected by a receiver of a pure galvanic reservoir monitor system operating at 1 kHz. However, the electromagnetic reservoir monitor 610 does not experience the disadvantages of a pure galvanic reservoir monitor described herein. The distance between the source and return electrodes 622 and 624 of the electromagnetic reservoir monitor 610, the amplitude of the current transmitted through the formation 612, the orientation of the coils of the magnetic receiver 626, and the dimensions of fluid reservoir 640 only represent one example embodiment of the electromagnetic reservoir monitor 610 used to monitor the fluid reservoir 640. The foregoing specifications of the electromagnetic reservoir monitor 610 may vary to monitor different fluid reservoirs having a different resistivity and deposited in a different formation.

Figure 8:
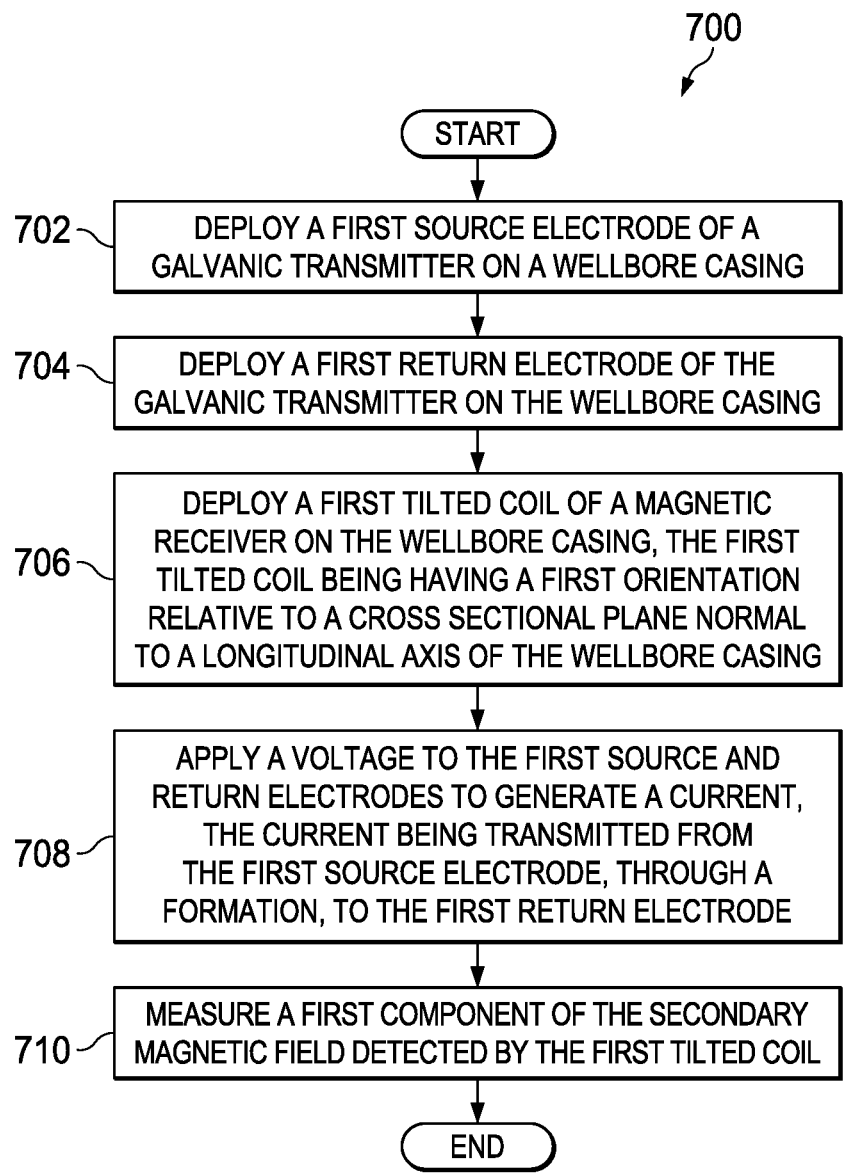
FIG. 8 illustrates a flow chart of a process to monitor a downhole reservoir.

FIG. 8 illustrates a flow chart of a process 700 to monitor a downhole reservoir. Although operations in the process 700 are shown in a particular sequence, certain operations may be performed in different sequences or at the same time where feasible. Further, although the process 700 describes deploying electrodes and coils around the casing 116 to detect reservoir properties of the fluid reservoir 140, the process 700 may also be applied to deploy electrodes and coils around other types of casings and to detect other fluid reservoirs in a downhole environment.

At step 702, a first source electrode of a galvanic transmitter is deployed on a wellbore casing, such as the casing 116. At step 704, a first return electrode of the galvanic transmitter is also deployed on the casing 116. In some embodiments, the first source and return electrodes may be deployed at different sections of the casing 116, where the different sections are deployed at different depths. In other embodiments, the source and return electrodes are positioned at different azimuths around a perimeter of the casing 116. In one of such embodiments, multiple pairs of source and return electrodes are deployed at different azimuths around the perimeter of the casing 116. Further, different pairs of source and return electrodes may be excited at different times to alternatively inject current into the subterranean formation 112.

At step 706, a first tilted coil of a magnetic receiver is deployed on the wellbore casing. The first tilted coil has a first orientation relative to a cross sectional plane normal to a longitudinal axis of the wellbore casing. In some embodiments, additional tilted coils are also deployed on the wellbore casing. In one of such embodiments, each of the multiple deployed tilted coils is oriented and/or rotated in a different direction relative to the longitudinal axis of the casing 116 to increase azimuth sensitivity of the induced electromagnetic signals indicative of one or more reservoir properties of the fluid reservoir 140. At step 708, a voltage is applied to the first source and return electrodes to generate a current, where the current is transmitted from the first source electrode, through the subterranean formation, to the first return electrode. In some embodiments, a focusing electrode deployed between the source electrode and the return electrode to further penetrate the injected current into the subterranean formation 112. In one of such embodiments, a first gap region is formed between the source electrode and the focusing electrode, and a second gap region is formed between the focusing electrode and the return electrode. Further, the voltage of the focusing electrode is adjusted until the voltage of the focusing electrode is substantially similar to the voltage of the source electrode to minimize vertical current flow in the region between the focusing electrode and the source electrode.

At step 710, a first component of the secondary magnetic field detected by the first tilted coil is measured. In some embodiments, the measured secondary magnetic field is utilized by an optoelectronic device such as a fiber optic sensor to generate and/or modulate optical signals, where the generated and/or modulated optical signals are indicative of the reservoir properties of the fluid reservoir 140. The generated and/or modulated optical signals are then transmitted via an optical fiber such as the optical fiber 119 towards the surface for processing.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, an electromagnetic reservoir monitor comprising a galvanic transmitter deployed proximate a wellbore casing and having a first source electrode and a first return electrode, wherein a current flowing from the first source electrode, through a formation, to the first return electrode is altered by a first fluid reservoir of the formation, and wherein an altered component of the current induces a first secondary magnetic field; and a magnetic receiver having a first tilted coil deployed proximate the wellbore casing, the first tilted coil having a first orientation relative to a cross sectional plane normal to a longitudinal axis of the wellbore casing, and the first tilted coil operable to detect a component of the first secondary magnetic field, wherein the secondary magnetic field is indicative of at least one property of the fluid reservoir.

Clause 2, the electromagnetic reservoir monitor of clause 1, wherein the at least one property of the first fluid reservoir comprises a resistivity of the first fluid reservoir, a conductivity of the first fluid reservoir, a position of the first fluid reservoir relative to the first tilted coil, dimensions of the first fluid reservoir, and a distance from the first fluid reservoir to the first tilted coil.

Clause 3, the electromagnetic reservoir monitor of clause 1 or 2, wherein the galvanic transmitter operates within a range of approximately 1 kHz to 50 kHz.

Clause 4, the electromagnetic reservoir monitor of at least one of clauses 1-3, wherein the first source electrode and the first return electrode reside in a first source region and a first return region, respectively, and wherein the first source region and the first return region are separated by a gap region to prevent the current from shorting.

Clause 5, the electromagnetic reservoir monitor of at least one of clauses 1-4, wherein the magnetic receiver comprises a second tilted coil deployed proximate the wellbore casing, the second tilted coil having a second orientation relative to the cross sectional plane.

Clause 6, the electromagnetic reservoir monitor of at least one of clauses 1-5, wherein the second tilted coil is operable to detect a second component of the first secondary magnetic field.

Clause 7, the electromagnetic reservoir monitor of at least one of clauses 1-6, wherein the first source electrode and the first return electrode are positioned at different azimuths around a perimeter of the wellbore casing.

Clause 8, the electromagnetic reservoir monitor of at least one of clauses 1-7, wherein the galvanic transmitter further comprises a second source electrode and a second return electrode positioned at different azimuths around the perimeter of the wellbore casing, wherein a second current flowing from the second source electrode, through the formation, to the second return electrode is altered by a second fluid reservoir of the formation, and wherein an altered component of the second current induces a second secondary magnetic field, and wherein the second tilted coil is operable to detect a component of the second secondary magnetic field.

Clause 9, the electromagnetic reservoir monitor of at least one of clauses 8, wherein the first source electrode and the second source electrode alternatively transmit the current and the second current across the formation to the first return electrode and the second return electrode, respectively.

Clause 10, the electromagnetic reservoir monitor of at least one of clauses 1-9, wherein the galvanic transmitter further comprises a focusing electrode operable to facilitate the current to penetrate the formation.

Clause 11, the electromagnetic reservoir monitor of at least one of clauses 1-10, further comprising a first gap region separating the first source electrode and the focusing electrode; and a second gap region separating the first return electrode and the focusing electrode, wherein the first source electrode and the first return electrode reside in a first source region and a first return region, respectively.

Clause 12, a method to monitor a downhole reservoir, comprising deploying a first source electrode of a galvanic transmitter on a wellbore casing; deploying a first return electrode of the galvanic transmitter on the wellbore casing; deploying a first tilted coil of a magnetic receiver on the wellbore casing, the first tilted coil being having a first orientation relative to a cross sectional plane normal to a longitudinal axis of the wellbore casing; applying a voltage to the first source and return electrodes to generate a current, the current being transmitted from the first source electrode, through a formation, to the first return electrode, wherein the current is altered by a water flood region of the formation, and wherein an altered component of the current induces a secondary magnetic field; and measuring a first component of the secondary magnetic field detected by the first tilted coil.

Clause 13, the method of clause 12, further comprising determining one or more of properties of the water flood region based on the secondary magnetic field.

Clause 14, the method of clause 12 or 13, wherein determining the one or more properties of the water flood region comprises determining at least one of a resistivity of the water flood region, a conductivity of the water flood region, dimensions of the water flood region, and a distance from the water flood region to the first tilted coil based on the secondary magnetic field.

Clause 15, the method of at least one of clauses 12-14, further comprising deploying a second tilted coil of the magnetic receiver on the casing, the second tilted coil having a second orientation relative to the cross sectional plane; and measuring a second component of the secondary magnetic field detected by the tilted coil.

Clause 16, the method of at least one of clauses 12-15, further comprising deploying a focusing electrode operable to facilitate the current to penetrate the formation.

Clause 17, the method of at least one of clauses 12-16, further comprising adjusting a voltage difference between the focus electrode and the source electrode to augment a penetration level of the current.

Clause 18, the method of at least one of clauses 12-17, further comprising deploying a second source electrode of the galvanic transmitter on the casing; deploying a second return electrode of the galvanic transmitter on the casing; applying a second voltage to the second source and return electrodes to generate a second current, wherein the second current is transmitted from the second source electrode, through the formation, to the second return electrode, wherein the second current is altered by a second water flood region of the formation, and wherein an altered component of the second current induces a second secondary magnetic field; and measuring a first component of the second secondary magnetic field detected by a second tilted coil.

Clause 19, an electromagnetic reservoir monitoring system, comprising a downhole reservoir monitor comprising a galvanic transmitter deployed proximate a wellbore casing and having a source electrode and a return electrode, wherein a current flowing from the source electrode, through a formation, to the wellbore casing, to the return electrode, is altered by a fluid reservoir of the formation, and wherein an altered component of the current induces a secondary magnetic field; and a magnetic receiver having a tilted coil deployed proximate the wellbore casing, the tilted coil having an orientation relative to a cross sectional plane normal to a longitudinal axis of the wellbore casing, the tilted coil operable to detect a component of the secondary magnetic field; a storage medium operable to store instructions to determine at least one property of the fluid reservoir; and a processor operable to execute the instructions to determine the at least one property of the fluid reservoir based on the secondary magnetic field.

Clause 20, the electromagnetic monitoring system of clause 19, wherein the at least one property of the fluid reservoir comprises a resistivity of the fluid reservoir, a conductivity of the water flood region, dimensions of the fluid reservoir, and a distance from the fluid reservoir to the tilted coil.

Unless otherwise specified, any use of any form of the terms "connect," "engage," "couple," "attach," or any other term describing an interaction between elements in the foregoing disclosure is not meant to limit the interaction to direct interaction between the elements and may also include indirect interaction between the elements described. As used herein, the singular forms "a", "an" and "the" are intended to include the plural forms as well, unless the context clearly indicates otherwise. Unless otherwise indicated, as used throughout this document, "or" does not require mutual exclusivity. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

It should be apparent from the foregoing that embodiments of an invention having significant advantages have been provided. While the embodiments are shown in only a few forms, the embodiments are not limited but are susceptible to various changes and modifications without departing from the spirit thereof.

We claim:

1. An electromagnetic reservoir monitor comprising:
a galvanic transmitter fixedly deployed on a wellbore casing and having a first source electrode and a first return electrode, wherein a current flowing from the first source electrode, through a formation, to the first return electrode is altered by a first fluid reservoir of the formation, and wherein an altered component of the current induces a first secondary magnetic field; and a magnetic receiver having a first tilted coil fixedly deployed on the wellbore casing, the first tilted coil having a first orientation relative to a cross sectional plane normal to a longitudinal axis of the wellbore casing, and the first tilted coil operable to detect a component of the first secondary magnetic field, wherein the secondary magnetic field is indicative of at least one property of the fluid reservoir.

2. The electromagnetic reservoir monitor of claim 1, wherein the at least one property of the first fluid reservoir comprises a resistivity of the first fluid reservoir, a conductivity of the first fluid reservoir, a position of the first fluid reservoir relative to the first tilted coil, dimensions of the first fluid reservoir, and a distance from the first fluid reservoir to the first tilted coil.

3. The electromagnetic reservoir monitor of claim 1, wherein the galvanic transmitter operates within a range of approximately 1 kHz to 50 kHz.

4. The electromagnetic reservoir monitor of claim 1, wherein the first source electrode and the first return electrode reside in a first source region and a first return region, respectively, and wherein the first source region and the first return region are separated by a gap region to prevent the current from shorting.

5. The electromagnetic reservoir monitor of claim 1, wherein the magnetic receiver comprises a second tilted coil fixedly deployed on the wellbore casing, the second tilted coil having a second orientation relative to the cross sectional plane.

6. The electromagnetic reservoir monitor of claim 5, wherein the second tilted coil is operable to detect a second component of the first secondary magnetic field.

7. The electromagnetic reservoir monitor of claim 1, wherein the first source electrode and the first return electrode are positioned at different azimuths around a perimeter of the wellbore casing.

8. The electromagnetic reservoir monitor of claim 7, wherein the galvanic transmitter further comprises:
a second source electrode and a second return electrode positioned at different azimuths around the perimeter of the wellbore casing,
wherein a second current flowing from the second source electrode, through the formation, to the second return electrode is altered by a second fluid reservoir of the formation, and wherein an altered component of the second current induces a second secondary magnetic field, and
wherein the second tilted coil is operable to detect a component of the second secondary magnetic field.

9. The electromagnetic reservoir monitor of claim 8, wherein the first source electrode and the second source electrode alternatively transmit the current and the second current across the formation to the first return electrode and the second return electrode, respectively.

10. The electromagnetic reservoir monitor of claim 1, wherein the galvanic transmitter further comprises a focusing electrode operable to facilitate the current to penetrate the formation.

11. The electromagnetic reservoir monitor of claim 10, further comprising:
a first gap region separating the first source electrode and the focusing electrode; and
a second gap region separating the first return electrode and the focusing electrode,
wherein the first source electrode and the first return electrode reside in a first source region and a first return region, respectively.

12. A method to monitor a downhole reservoir, comprising:
fixedly deploying a first source electrode of a galvanic transmitter on a wellbore casing;
fixedly deploying a first return electrode of the galvanic transmitter on the wellbore casing;
fixedly deploying a first tilted coil of a magnetic receiver on the wellbore casing, the first tilted coil being having a first orientation relative to a cross sectional plane normal to a longitudinal axis of the wellbore casing;
applying a voltage to the first source and return electrodes to generate a current, the current being transmitted from the first source electrode, through a formation, to the first return electrode, wherein the current is altered by a water flood region of the formation, and wherein an altered component of the current induces a secondary magnetic field; and
measuring a first component of the secondary magnetic field detected by the first tilted coil.

13. The method of claim 12, further comprising:
deploying a second tilted coil of the magnetic receiver on the casing, the second tilted coil having a second orientation relative to the cross sectional plane; and
measuring a second component of the secondary magnetic field detected by the tilted coil.

14. The method of claim 12, further comprising:
deploying a second source electrode of the galvanic transmitter on the casing;
deploying a second return electrode of the galvanic transmitter on the casing;
applying a second voltage to the second source and return electrodes to generate a second current, wherein the second current is transmitted from the second source electrode, through the formation, to the second return electrode, wherein the second current is altered by a second water flood region of the formation, and wherein an altered component of the second current induces a second secondary magnetic field; and
measuring a first component of the second secondary magnetic field detected by a second tilted coil.

15. The method of claim 12, further comprising determining one or more of properties of the water flood region based on the secondary magnetic field.

16. The method of claim 15, wherein determining the one or more properties of the water flood region comprises determining at least one of a resistivity of the water flood region, a conductivity of the water flood region, dimensions of the water flood region, and a distance from the water flood region to the first tilted coil based on the secondary magnetic field.

17. The method of claim 12, further comprising deploying a focusing electrode operable to facilitate the current to penetrate the formation.

18. The method of claim 17, further comprising adjusting a voltage difference between the focus electrode and the source electrode to augment a penetration level of the current.

19. An electromagnetic reservoir monitoring system, comprising:
a downhole reservoir monitor comprising:
a galvanic transmitter fixedly deployed on a wellbore casing and having a source electrode and a return electrode, wherein a current flowing from the source electrode, through a formation, to the wellbore casing, to the return electrode, is altered by a fluid reservoir of the formation, and wherein an altered component of the current induces a secondary magnetic field; and a magnetic receiver having a tilted coil fixedly deployed on the wellbore casing, the tilted coil having an orientation relative to a cross sectional plane normal to a longitudinal axis of the wellbore casing, the tilted coil operable to detect a component of the secondary magnetic field;

a storage medium operable to store instructions to determine at least one property of the fluid reservoir; and a processor operable to execute the instructions to determine the at least one property of the fluid reservoir based on the secondary magnetic field.

20. The electromagnetic monitoring system of claim 19, wherein the at least one property of the fluid reservoir comprises a resistivity of the fluid reservoir, a conductivity of the water flood region, dimensions of the fluid reservoir, and a distance from the fluid reservoir to the tilted coil.

* * * * *